United States Patent [19]

Budevski et al.

[11] 4,031,033

[45] June 21, 1977

[54] METHOD FOR PRODUCING POWDERED WETPROOFED MATERIAL USEFUL IN MAKING GAS-DIFFUSION ELECTRODES

[75] Inventors: Evgueni Bogdanov Budevski; Iliya Dimitrov Iliev; Anastasiya Rostislavova Kaisheva; Sergei Sergeev Gamburtzev; Elena Borisova Vakanova, all of Sofia, Bulgaria

[73] Assignee: ZLEHIT pri BAN, Sofia, Bulgaria

[22] Filed: May 30, 1975

[21] Appl. No.: 582,475

Related U.S. Application Data

[63] Continuation-in-part of Ser. No. 486,785, July 9, 1974, abandoned, which is a continuation of Ser. No. 235,063, March 15, 1972, abandoned.

[30] Foreign Application Priority Data

Mar. 29, 1971 Bulgaria .................................. 17175

[52] U.S. Cl. ............................ 252/511; 252/425.3
[51] Int. Cl.$^2$ ...................... H01M 4/08; H01B 1/06
[58] Field of Search .............. 136/120 FC, 122; 117/100 B, 100 A; 264/126, 127; 252/511, 425.3

[56] References Cited

UNITED STATES PATENTS

| | | | |
|---|---|---|---|
| 2,782,180 | 2/1957 | Weidman | 136/122 X |
| 3,272,897 | 9/1966 | Herman et al. | 264/109 |
| 3,297,484 | 1/1967 | Niedrach | 136/120 FC |
| 3,488,225 | 1/1970 | Selker et al. | 136/120 FC |
| 3,634,569 | 1/1972 | Emanuelson et al. | 136/122 |
| 3,649,365 | 3/1972 | Paynter et al. | 136/120 FC |

*Primary Examiner*—John H. Mack
*Assistant Examiner*—H. A. Feeley
*Attorney, Agent, or Firm*—Ladas, Parry, Von Gehr, Goldsmith & Deschamps

[57] ABSTRACT

Powdered wetproofed materials, useful for the manufacture of gas-diffusion electrodes, are produced by forming a suspension of an electroconductive powder in a liquid which is water or an organic solvent in the presence of a wetproofing agent and recovering the wetproofed material.

3 Claims, No Drawings

METHOD FOR PRODUCING POWDERED WETPROOFED MATERIAL USEFUL IN MAKING GAS-DIFFUSION ELECTRODES

CROSS REFERENCES TO RELATED APPLICATIONS

This application is a continuation-in-part of our earlier application Ser. No. 486,785, filed July 9, 1974, said Ser. No. 486,785 being a continuation of Application Ser. No. 235,063, filed Mar. 15, 1972, which is now abandoned.

BACKGROUND OF THE INVENTION

1. Field of the Invention

The present invention relates to a method for producing powdered wetproofed material for gas-diffusion electrodes, from electroconductive powder especially carbon black and from wetproofing agents.

2. Description of the Prior Art

The use of carbon and other catalytically active materials and wetproofing substances (polytetrafluoroethylene, poly ethylene, polypropylene, elastomers and others) for the manufacture of gas-diffusion electrodes is well known. A characteristic feature of the known methods for producing gas-diffusion electrodes containing such materials is that the catalytically active materials (platinum black, silver, activated carbon and others) are also wetproofed and the wetproofing process proceeds during or after the preparation of the electrodes (U.S. Pat. Nos. 3,348,974, 3,386,685, 3,405,010, 3,423,247; French Pat. No. 1,529,016; East German Pat. No. 56,837).

These methods possess a number of disadvantages. A considerable part of the active surface area of the catalyst is blocked during wetproofing of the electrodes and is excluded from the electrochemical reaction. This leads to a decrease of the electrode effficiency. In addition, in each particular case suitable wetproofing agents must be found and optimum conditions under which the wetproofing process is to be performed must be determined. The gas supply in such electrodes strongly depends on the porous structure of the catalytically active material and it is not always possible to find the appropriate conditions ensuring a satisfactory gas supply in the presence of electrochemically inert gases such as nitrogen (from the air).

This is also the case with respect to Japanese Pat. Publication 7,012,562 (Matsushita) which discloses mixing dry powders of carbon (catalyst powder) and resin powder. The description of the Matsushita publication on page 1, lines 28–34 states that the known use of a polytetrafluoroethylene (PTFE) dispersion for wetproofing results in a very short lifetime for the electrode. Matsushita attempts to improve this by mixing dry carbon and PTFE powders and using a further polymeric binder. In the process according to this Japanese Patent, catalyst powder (carbon powder) is mechanically mixed with fluoro resin powder; the mixture (as a powder or as a pressure-molded tablet) is heat-treated (at 350° C) and then pulverized into powder. The pulverized powder is mixed with a solution of synthetic resin (polyvinyl chloride in tetrahydrofuran) as a binder, press-molded and then dried. This Japanese process differs both in the procedure used and the material treated, compared to the method of the present invention. In the method of the present invention, a suspension of electrically-conductive powder (e.g. carbon black) in a liquid is mixed with a dispersion of wetproofing agent and under these conditions uniform homigenization and combination of the particles takes place, the procedure itself thus differing from the method of the Japanese Patent. Further, in the present method, the conductive powder is itself not active as a catalyst, whereas in the Japanese method the catalytically active carbon powder is wetproofed. Thus, in the Japanese patent, a substantial part of the active surface of the catalyst is blocked, which leads to a decrease of the electrochemical activity. The ultimately formed electrode of the Japanese patent is prepared from this wetproofed catalytically active material, while according to the present method, an electrochemically inactive material (e.g. carbon black) is wetproofed and the obtained wetproofed material may be used in combination with a proper catalyst (not subjected to wetproofing) for the ultimate preparation of gas-diffusion electrodes.

It also may be seen from the description of said Japanese publication 7,012,562 that the wetproofed material is additionally mixed with a solution of synthetic resin (polyvinyl chloride in tetrahydrofuran) as a binder, which can lead to a deterioration of hydrophobic properties and to an additional decrease of the electrochemical activity of the catalyst, while the wetproofed material obtained according to the present method does not need an additional binder, because it is used as a binder itself.

U.S. Pat. No. 3,432,355 (Niedrach, et al) is typical of other prior art, and discloses an electrode consisting of platinum black and PTFE pressed on a nickel screen. The electrode is made by applying an aqueous slurry of platinum black and PTFE to a PTFE film. The water is then evaporated. The resulting wetproofed platinum black is not sufficiently hyddrophobic, thus requiring use of the PTFE film.

According to the description and claims of the said Niedrach, et al. patent, the electrodes are prepared in the following way. On a PTFE surface film an aqueous slurry of platinum black and PTFE dispersion is spread, the water is evaporated and the temperature is increased to dispel the emulsifying agent. The electrode consists of two such layers (one of them without PTFE film) sintered on the screen.

Platinum black wetproofed in this way does not have enough hydrophobic properties to stop the leakage of the electrolyte through the electrode. The lack of sufficient hydrophobic properties compelled Niedrach, et al. to cover the gas side of electrodes with a thin gas-permeable film consisting essentially of PTFE. This film renders the electrode impervious to the aqueous electrolyte (U.S. Pat. No. 3,432,355, page 1, lines 59-61). The use of such PTFE film is absolutely necessary because platinum black wetproofed according to the method described by Niedrach, et al. is not hydrophobic enough; when electrodes without such a film are investigated two very harmful effects are observed: flooding of electrodes and penetration of the electrolyte through the electrodes. This is clearly explained in the article of the same authors, (Niedrach, L. W. and Alford, H. R., J. Electrochem. Soc. 1965, Vol. 112, No. 2, p. 117-124), in which a detailed investigation of electrodes described in U.S. Pat. No. 3,432,355 is given. Even the presence of PTFE film cannot completely stop leakage and said article states that "a small amount of seepage has, however, been observed with all the electrodes tested to date" (page 119, right column, lines 36-38). Therefore, platinum black wetproofed with PTFE according to the method of Niedrach, et al. is not hydrophobic enough to stop leakage of electrolyte through the electode and leakage is not completely stopped even with the addition of a thin PTFE film. Thus, it follows that according to the method of Niedrach, et al. a material with sufficiently hydrophobic properties cannot be obtained.

The method described in U.S. Pat. No. 3,272,897 (Herman, et al) involves use of a polymer obtained upon contact of two immiscible solutions. This method is not suitable for forming polytetrafluoroethylene, which is the preferred wetproofing material for gas-diffusion electrodes.

According to the description of U.S. Pat. No. 3,335,034 (Laurent), the catalyst (active carbon, silver or nickel) is wetproofed with a solution of polystyrene. One side of the pellet formed from this material is additionally coated with silver catalyst. This patent does not disclose data for the lifetime of the electrodes, and the reference electrode against which the polarization is measured is not specified.

An electrode described in U.S. Pat. No. 3,459,652 (Grangaard) consists of catalyst (active carbon) wetproofed with paraffin (intimately mixed with and adsorbed by the carbon particles). This patent does not disclose data for the polarization and current densities of the resulting electrodes.

U.S. Pat. No. 3,537,906 (Sindorf) concerns an oxygen electrode consisting of a catalyst (silver powder) wetproofed with a PTFE dispersion. There are not data given for the lifetime of the resulting electrodes or for the polarization when the working gas is oxygen from the air.

U.S. Pat. No. 3,549,423 (Grubb, et al) concerns oxygen electrodes consisting of a catalyst (platinum) wetproofed with PTFE and a hydrophobic polymer (PTFE) film. There are no data disclosed for the lifetime of the electrodes.

According to the description and claims of U.S. Pat. No. 3,351,494 (Batzold), the disclosed method of preparing electrodes consists of mixing a catalyst of the platinum group metals with a wetproofed base. The wetproofed base is prepared by soaking the base material (asbestos, carbon, mica or alumina) in a wetproofing solution (halogenated silanes). The particulate base material used has diameters within the range of from about 50 – 350 microns. Apparently the base material is soaked, because it consists of porous particles. In the method of the present invention, the particles, e.g. carbon black, have dimensions less than 0.1 micron and are without pores.

In the above prior art, it is the catalytically active material which is wetproofed, and this results in blocking a considerable part of the active surface of the catalyst, leading to a decrease in the electrochemical activity of the electrode prepared therefrom. In contrast, the present invention provides a material in which an electrochemically inactive material (e.g. carbon black), which is not catalytically active, is wetproofed. The resulting material has uniform hydrophobic properties and may be combined with a catalytically active material (not itself subjected to wetproofing) to produce an electrode having an extremely long lifetime.

SUMMARY OF THE INVENTION

The present invention provides an efficient method for obtaining powdered wetproofed material useful for making gas-diffusion electrodes. The method of the invention comprises the steps of (1) forming a suspension of a powder consisting of electrochemically inactive, electrically conductive micropore-free grains in a liquid dispersing medium in the presence of at least one-high molecular weight polyolefin wetproofing agent, (2) mixing until the suspension is homogenized and (3) recovering the wetproofed materials in the form of dry, disintegrated solids.

In an embodiment of the invention the recovered wetproofed materials may be combined with electrically conductive catalyst particles having catalytic activity for the electrochemical reduction of oxygen, such as activated carbon particles, thereby forming a material suitable for use as a gas-diffusion electrode.

DESCRIPTION OF THE PREFERRED EMBODIMENTS

According to the invention, an electroconductive powder consisting of electrochemically inactive, electrically conductive micropore-free grains (for example, carbon black) and a wetproofing agent (one or more hydrophobic polymers, e.g. PTFE, natural or synthetic rubber, polyethylene, polyisobutylene, polypropylene) are mixed together as a dilute suspension in a fluid dispersing medium (water or an organic solvent). Under these conditions uniform homogenization of both phases in the dispersing medium is achieved and a combination of the particles of both phases takes place. After this the dispersing medium is discarded and the agglomerates of the obtained wetproofed material are disintegrated. When using an aqueous polymer dispersion, any stabilizer which may be present in the dispersion is removed from the wetproofed material (by washing and heating) and the agglomerates of the wetproofed material are again disintegrated.

More particularly, an electroconductive powder consisting of micropore-free grains, for example carbon black, is mixed as an aqueous dispersion, or directly with an aqueous dispersion or an organic solution of a hydrophobic polymer. The mixing is performed at ambient or elevated temperature. After homogenization of both phases in the dispersing medium, the latter is discarded and the obtained wetproofed material is disintegrated. When using an aqueous polymer dispersion, the stabilizer of the dispersion is removed from the wetproofed material and the wetproofed material is again disintegrated. The solid content of the electroconductive powder in the aqueous dispersion ranges between 1 and 5 weight percent. Different hydrophobic polymers are used as wetproofing agents, separately or in combination, for example polytetrafluoroethylene (PTFE), polyethylene, polypropylene, natural and synthetic rubbers. The content of the wetproofing agent in the aqueous dispersions or in the organic solutions ranges from 1 to 60 weight percent. When organic solutions of wetproofing agents are used, the electroconductive powder is introduced therein at the boiling temperature of the organic solvent. The stabilizers of the aqueous polymer dispersions are removed from the wetproofed material by heating at a temperature of 250° – 350° C or by washing.

The above mentioned terms have the following meaning:

"Micropore-free grains" refers to particles without connected porosity. This term does not exclude particles with rough surfaces.

"Suspension of the electroconductive powder" refers to a two-phase dispersed system. In such a system, the liquid is the dispersing medium and the solid phase is the dispersed phase.

"Wetproofing agents" refers to substances possessing a contact angle (with a working electrolyte solution in an electrolytic cell) larger than 90°, predominantly high molecular weight organic compounds. They are employed as organic solutions, fine powders or aqueous dispersions. Usually surface active substances, called stabilizers are introduced into the aqueous dispersions in order to prevent the sedimentation of the dispersions.

Wetproofed material prepared in accordance with the present invention from carbon black (as a dilute suspension) combined with a PTFE dispersion is hydrophobic enough to completely stop seepage of electrolyte through an electrode prepared from such material, without adding a PTFE film as is required in the prior art. Carbon electrodes prepared from the present wetproofed material combined with activated carbon as catalyst and without a PTFE film have been tested (in 7n KOH) as air (oxygen) electrodes at normal pressure for more than 15,000 hours continuous load and no seepage has been detected.

The following examples are intended to illustrate the present invention without limiting it:

EXAMPLE 1

7 g carbon black are suspended into 350 cm$^3$ of water. 150 cm$^3$ of an aqueous dispersion of polytetrafluoroethylene (PTFE) with a dry content for example of 2 weight percent are added to the suspension. This is done at a temperature of 15° – 45° C. After homogenization of the obtained mixture the dispersing medium is removed by filtration and drying of the precipitate. The dry material is disintegrated and heated at a temperature of 250° – 350° C for 30 to 90 minutes and then again disintegrated. The obtained powdered material, containing for example 70 weight percent carbon black and 30 weight percent polytetrafluoroethylene (PTFE) is used for producing gas-diffusion electrodes, as an electrochemically inactive, electrically conductive hydrophobic porous structure, especially in air oxygen electrodes for metal-air power sources and fuel cells.

EXAMPLE 2

The same procedure as in example 1 is carried out except that as wetproofing agent the corresponding amount of natural rubber is used as an aqueous dispersion (latex), with a dry content of 5 weight percent. In the final product the removal of the stabilizers is performed by washing with hot water and subsequent drying at a temperature of 100°–140° C.

EXAMPLE 3

The same procedure according to example 2 is carried out except that an aqueous dispersion (latex) of butadiene styrene rubber is used as the wetproofing agent.

EXAMPLE 4

2 g of high pressure polyethylene are dissolved into 200 cm$^3$ toluene with heating at a temperature of 100° – 110° C. 8 g carbon black are introduced into the obtained solution and 300 cm$^3$ toluene are added. After cooling the suspension, the organic solvent is filtered and the precipitate is dried and disintegrated. The obtained powdered wetproofed material is employed for the production of gas-diffusion electrodes, as an electrochemically inactive, electrically conductive hydrophobic porous structure, especially in air oxygen electrodes.

EXAMPLE 5

The procedure is similar to that described in example 4, except that polyisobutylene is used as the wetproofing agent.

EXAMPLE 6

The procedure is similar to that described in example 4, except that polypropylene is used as the wetproofing agent.

The powdered wetproofed materials obtained in accordance with the described examples of the present invention possess the properties required for use in preparation of gas-diffusion electrodes, since the materials are electrochemically inactive, electrically conductive, have a hydrophobic porous structure and simultaneously function as a binder. This is shown in Table 1 below, where the physical characteristics of such powdered wetproofed materials are listed. Such materials can be stored in large amounts for a long time while retaining their properties. All these properties make them a suitable material for the mass manufacture of gas-diffusion electrodes.

Starting from the obtained powdered wetproofed materials according to the method of the present invention it is possible to produce gas-diffusion electrodes with different catalysts, designed to operate in different systems, for example metalair system or fuel cells employing gaseous or liquid fuel, making use of acid or alkali electrolytes.

The air oxygen (air-breathing) electrodes produced from the above described powdered wetproofed materials and activated carbon (not wetproofed) as catalyst, yield a current density of up to 150mA/cm$^2$ in 7NKOH at a polarization of 200 mV (IR-drop included) against a Hg/HgO reference electrode (in the same electrolyte) and ambient temperature, with oxygen from the air as operating gas at normal pressure. The lifetime (the time to reach a polarization of 250mV against a Hg/HgO reference electrode) of the above mentioned electrodes under continuous operation varies and depends on the kind of wetproofing agent and the density of the operating current. As an example, with air as the operating gas (without removal of carbon dioxide) and employing polyethylene as wetproofing agent and binder, at a current density of 50 mA/cm$^2$, the lifetime of the electrode is 2,000 hours. When using polyisobutylene as the wetproofing agent and binder, the lifetime under the same conditions is doubled to 4,000 hours. The best results are obtained when using polytetrafluoroethylene as the wetproofing agent and binder, and at a current density of 50 mA/cm$^2$, the lifetime is 10,000 hours; at a current density of 30 mA/cm$^2$ the lifetime is 15,000 hours.

Table 1

| | PHYSICAL CHARACTERISTICS OF HYDROPHOBIC POWDERED MATERIALS | | | |
|---|---|---|---|---|
| Waterproofing agents* | Porosity % | Specific surface area BET method m$^2$/g | Coefficient of gas transfer, cm$^4$/sec. mm Hg | Specific electro-resistance cm |
| Polytetrafluoroethylene | 54.7 | 21.8 | 0.5 × 10$^{-3}$ | 0.63 |

Table 1-continued

PHYSICAL CHARACTERISTICS OF
HYDROPHOBIC POWDERED MATERIALS

| Waterproofing agents* | Porosity % | Specific surface area BET method m²/g | Coefficient of gas transfer, cm⁴/sec. mm Hg | Specific electro-resistance cm |
|---|---|---|---|---|
| Polyethylene, high pressure | 64.0 | 22.5 | $0.6 \times 10^{-3}$ | 0.56 |
| Polyisobutylene | 63.0 | 25.2 | $0.7 \times 10^{-3}$ | 0.68 |

P = 200 kg/cm²
*Content of the wetproofing agent - invariable.

What is claimed is:

1. A method of producing a powdered wetproofed material useful for the production of gas-diffusion electrodes, the method comprising the steps of (1) combining an aqueous suspension of a powder consisting of electrochemically inactive, electrically conductive micropore-free grains consisting of carbon black in an amount between 1 and 5 percent by total weight of said aqueous suspension, with an aqueous dispersion of a high molecular weight polyolefin wetproofing agent consisting of polytetrafluoroethylene, said aqueous dispersion of said polyolefin including a dispersion stabilizer, (2) mixing at ambient temperature until the resulting mixture is homogenized and (3) removing the liquid phase by filtration, drying and disintegrating the obtained solids, removing the stabilizer from the solids by heating, and again disintegrating said solids, thereby obtaining the powdered wetproofed material.

2. A method according to claim 1, wherein the amount of said wetproofing agent in said aqueous dispersion is between 1 and 60 percent by total weight of said aqueous dispersion.

3. A method according to claim 1, wherein said removal of stabilizers from the obtained solids is carried out by heating at a temperature from 250° to 350° C.

* * * * *